United States Patent  
Line et al.

(10) Patent No.: US 11,279,300 B1
(45) Date of Patent: Mar. 22, 2022

(54) VEHICLE SEATING ASSEMBLY WITH PANEL ASSEMBLY

(71) Applicant: Ford Global Technologies, LLC, Dearborn, MI (US)

(72) Inventors: Johnathan Andrew Line, Northville, MI (US); Anna Hendrickson, Royal Oak, MI (US); Jason Matthew Koberstein, Troy, MI (US); Keith Allen Godin, Dearborn, MI (US); Sean Bayle West, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/073,776

(22) Filed: Oct. 19, 2020

(51) Int. Cl.
*B60N 2/36* (2006.01)
*B60R 13/01* (2006.01)
*B60N 2/60* (2006.01)

(52) U.S. Cl.
CPC .............. *B60R 13/013* (2013.01); *B60N 2/36* (2013.01); *B60N 2/366* (2013.01); *B60N 2/6009* (2013.01); *B60N 2/6018* (2013.01); *B60N 2002/363* (2013.01); *B60R 2013/015* (2013.01); *B60R 2013/018* (2013.01)

(58) Field of Classification Search
CPC ..... B60N 2/36; B60N 2/366; B60N 2002/363
See application file for complete search history.

(56) References Cited

U.S. PATENT DOCUMENTS

| 2,956,837 | A |   | 10/1960 | Koplin |
|---|---|---|---|---|
| 3,097,881 | A | * | 7/1963 | Aguilar ................ B60N 2/305 |
|   |   |   |   | 296/66 |
| 3,202,453 | A | * | 8/1965 | Richards ............ B60N 2/3093 |
|   |   |   |   | 296/66 |
| 3,604,022 | A |   | 9/1971 | Smith |
| 4,428,611 | A |   | 1/1984 | Widmer |
| 4,443,034 | A | * | 4/1984 | Beggs ...................... B60R 5/04 |
|   |   |   |   | 296/65.17 |

(Continued)

FOREIGN PATENT DOCUMENTS

| CN |   | 203819364 U | * | 9/2014 | ............. B62D 25/20 |
|---|---|---|---|---|---|
| DE | 102005041157 A1 | * | 3/2007 | ............... B60N 2/36 |

(Continued)

OTHER PUBLICATIONS

AutoTruckToys.com. Printed Apr. 1, 2013, "Mopar OEM Dodge Ram Flat Load Floor". http://www.autotrucktoys.com/ram/Mopar-OEM-Dodge-Ram-Flat-Load-Floor-PRD27019.aspx. 1 page.

(Continued)

*Primary Examiner* — Timothy J Brindley
(74) *Attorney, Agent, or Firm* — Vichit Chea; Price Heneveld LLP

(57) ABSTRACT

A seating assembly includes a seat base operably coupled with a seatback. A panel assembly includes a first panel coupled with the seatback and a second panel hingedly coupled with the first panel. The second panel includes a connector assembly having a housing and a support slidably coupled with the housing. The second panel is movable between a first position and a second position. The second panel is vertically aligned with the first panel in the first position and is substantially coplanar with the first panel in the second position.

15 Claims, 11 Drawing Sheets

(56) References Cited

U.S. PATENT DOCUMENTS

| | | | |
|---|---|---|---|
| 5,322,335 | A | 6/1994 | Niemi |
| 6,089,641 | A | 7/2000 | Mattarella et al. |
| 6,406,084 | B1 | 6/2002 | de Campos et al. |
| 6,698,829 | B1 | 3/2004 | Freijy et al. |
| 6,702,355 | B1 | 3/2004 | Price et al. |
| 7,159,922 | B2 | 1/2007 | Lyoda et al. |
| 8,353,550 | B1 | 1/2013 | Lucas |
| 8,505,999 | B2 | 8/2013 | Whalen et al. |
| 8,528,957 | B2 | 9/2013 | Ugalde et al. |
| 8,894,124 | B2 * | 11/2014 | Thota ............... B60N 2/36 296/37.16 |
| 10,286,849 | B2 | 5/2019 | Clifford et al. |
| 2003/0057724 | A1 * | 3/2003 | Inagaki ............. B60N 2/36 296/37.8 |
| 2009/0108639 | A1 | 4/2009 | Sturt et al. |
| 2011/0133508 | A1 | 6/2011 | Zuelch |
| 2011/0248523 | A1 * | 10/2011 | Aebker .............. B60N 2/36 296/66 |
| 2013/0001972 | A1 | 1/2013 | Ugalde et al. |
| 2013/0147226 | A1 * | 6/2013 | Cao .................. B60N 2/36 296/37.16 |
| 2018/0281688 | A1 * | 10/2018 | Matsunami ........ B60N 2/3011 |
| 2019/0366899 | A1 * | 12/2019 | Valencia Flores ..... B60N 2/206 |
| 2021/0009016 | A1 * | 1/2021 | Edwards ............ B60N 2/3011 |
| 2021/0284050 | A1 * | 9/2021 | Kaatz ................ B60N 2/36 |

FOREIGN PATENT DOCUMENTS

| | | | | |
|---|---|---|---|---|
| DE | 102006021720 | A1 * | 11/2007 | ............ B60N 2/36 |
| DE | 102007050140 | A1 * | 4/2009 | ........... B60N 2/305 |
| DE | 102008011737 | A1 * | 9/2009 | ............ B60N 2/36 |
| EP | 1297996 | A1 * | 4/2003 | .......... B60N 2/3065 |
| EP | 2505426 | A1 * | 10/2012 | ............ B60N 2/36 |
| FR | 2946929 | A1 * | 12/2010 | ............ B60R 5/04 |
| FR | 3037010 | A1 * | 12/2016 | .......... B60N 2/3075 |
| JP | 2003300431 | A1 | 10/2003 | |
| JP | 2014004881 | A * | 1/2014 | .......... B60N 2/2893 |
| JP | 2018002003 | A | 1/2018 | |

OTHER PUBLICATIONS

Plunkett, Bob. www.carlist.com. Publication Date Mar. 21, 2011, "2011 GMC Acadia Denali CUV". http://www.carlist.com/newcars/newcar.php?id=2051&yr=n. 2 pages.

* cited by examiner

VEHICLE SEATING ASSEMBLY WITH PANEL ASSEMBLY

FIELD OF THE DISCLOSURE

The present disclosure generally relates to a panel assembly, and more specifically to a panel assembly for coupling with a vehicle seating assembly.

BACKGROUND OF THE DISCLOSURE

Vehicle seats, particularly rear seating assemblies, may be positioned proximate a cargo area and may be moved to a folded position or removed to enlarge the cargo area. Panels may be used to extend the cargo area.

SUMMARY OF THE DISCLOSURE

According to one aspect of the present disclosure, a seating assembly includes a seat base operably coupled with a seatback. A panel assembly includes a first panel coupled with the seatback and a second panel hingedly coupled with the first panel. The second panel includes a connector assembly having a housing and a support slidably coupled with the housing. The second panel is movable between a first position and a second position. The second panel is vertically aligned with the first panel in the first position and is substantially coplanar with the first panel in the second position.

Embodiments of this aspect of the disclosure can include any one or a combination of the following features:
- an anchor member positioned on a first panel and having a coupling end extending from the first panel;
- a receiving member positioned on a second panel and defining a receiving well, wherein a coupling end of an anchor member is received by the receiving well to retain the second panel in a first position;
- a receiving member including a plurality of grips configured to engage with a cover material of a first panel to retain a second panel in a first position;
- a connection member positioned proximate a panel assembly, wherein a support of a connector assembly is configured to be selectively engaged with the connection member;
- a connection member positioned on a rear edge of a cargo floor positioned rearward of a panel assembly; and/or
- a member extending from a second panel and configured to actuate movement of the second panel from a first position to a second position.

According to another aspect of the present disclosure, a seating system includes a first seating assembly having a first seat base operably coupled with a first seatback and a second seating assembly having a second seat base operably coupled with a second seatback. The first seating assembly is positioned forward of the second seating assembly. A first panel is positioned on the second seatback, and a second panel is hingedly coupled with the first panel and movable between first and second positions. The second panel is substantially coplanar with the first panel when the second panel is in the second position and is configured to be selectively engaged with the first seatback in the second position.

Embodiments of this aspect or any other described aspect of the disclosure can include any one or a combination of the following features:
- an anchor member positioned on a first panel;
- a receiving member positioned on a second panel and defining a receiving well, wherein an anchor member is at least partially received by the receiving well to retain the second panel in a first position;
- a connector assembly having a support slidably coupled with a housing, wherein the housing is coupled with the second panel;
- a connection member positioned on a first seatback, wherein a first seating assembly is movable between an upright position and a pitched position, and further wherein a connector assembly is configured to be selectively engaged with the connection member when the first seating assembly is in the pitched position;
- a connection member integrally formed with a rear panel of a first seatback;
- a second seating assembly including a headrest configured to at least partially support a second panel in a second position; and/or
- a first seating assembly movable between an upright position and a folded position, wherein a second panel extends along a first seatback in a second position.

According to another aspect of the present disclosure, a seating system include a first seating assembly having a first seat base operably coupled with a first seatback. A panel assembly includes a first panel and a second panel. The second panel is hingedly coupled with the first panel and is movable between first and second positions. The second panel is substantially coplanar with the first panel when the second panel is in the second position. A connection member is positioned proximate the panel assembly. A connector assembly is positioned on the second panel and includes a support configured to be selectively engaged with the connection member.

Embodiments of this aspect or any other described aspect of the disclosure can include any one or a combination of the following features:
- a connector assembly including a housing coupled with a second panel and a support movable between a stowed position and an extended position, wherein the support is received by the housing in the stowed position;
- a first panel coupled with a cargo floor positioned rearward of a first seating assembly;
- a connection member positioned on a rear edge of a cargo floor;
- a connection member positioned on a first seatback;
- a second seating assembly having a second seat base operably coupled with a second seatback, wherein a first seating assembly is positioned forward of the second seating assembly and a first panel is coupled with the second seatback; and/or
- a retention assembly positioned between first and second panels to selectively retain the second panel in a first position.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
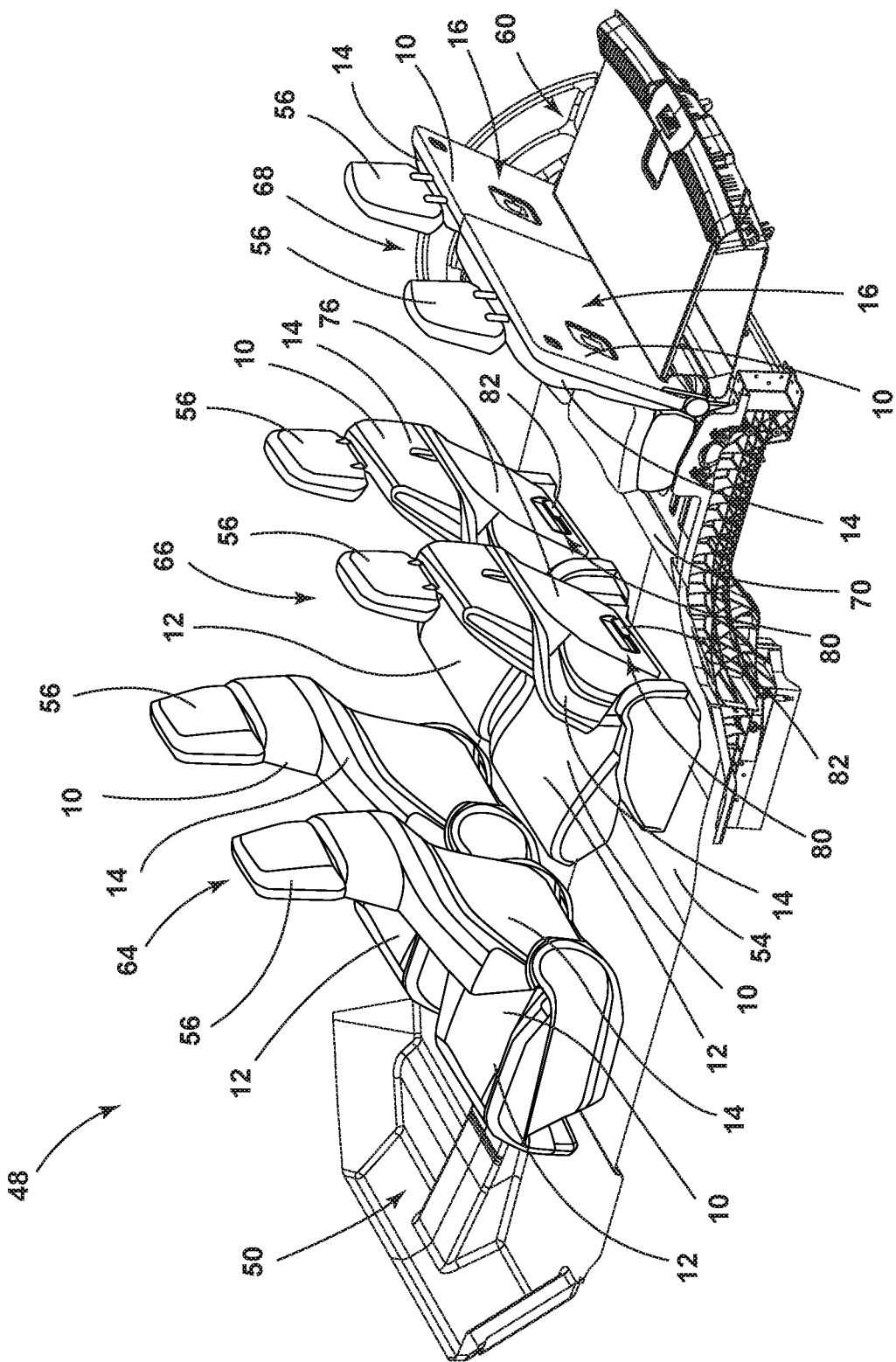
FIG. 1 is a top perspective view of seating assemblies exemplarily positioned on a vehicle floor and with a panel assembly positioned on seating assemblies of a rear row in a first position, according to various examples.

The present illustrated embodiments reside primarily in combinations of method steps and apparatus components related to a panel assembly selectively couplable with a seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
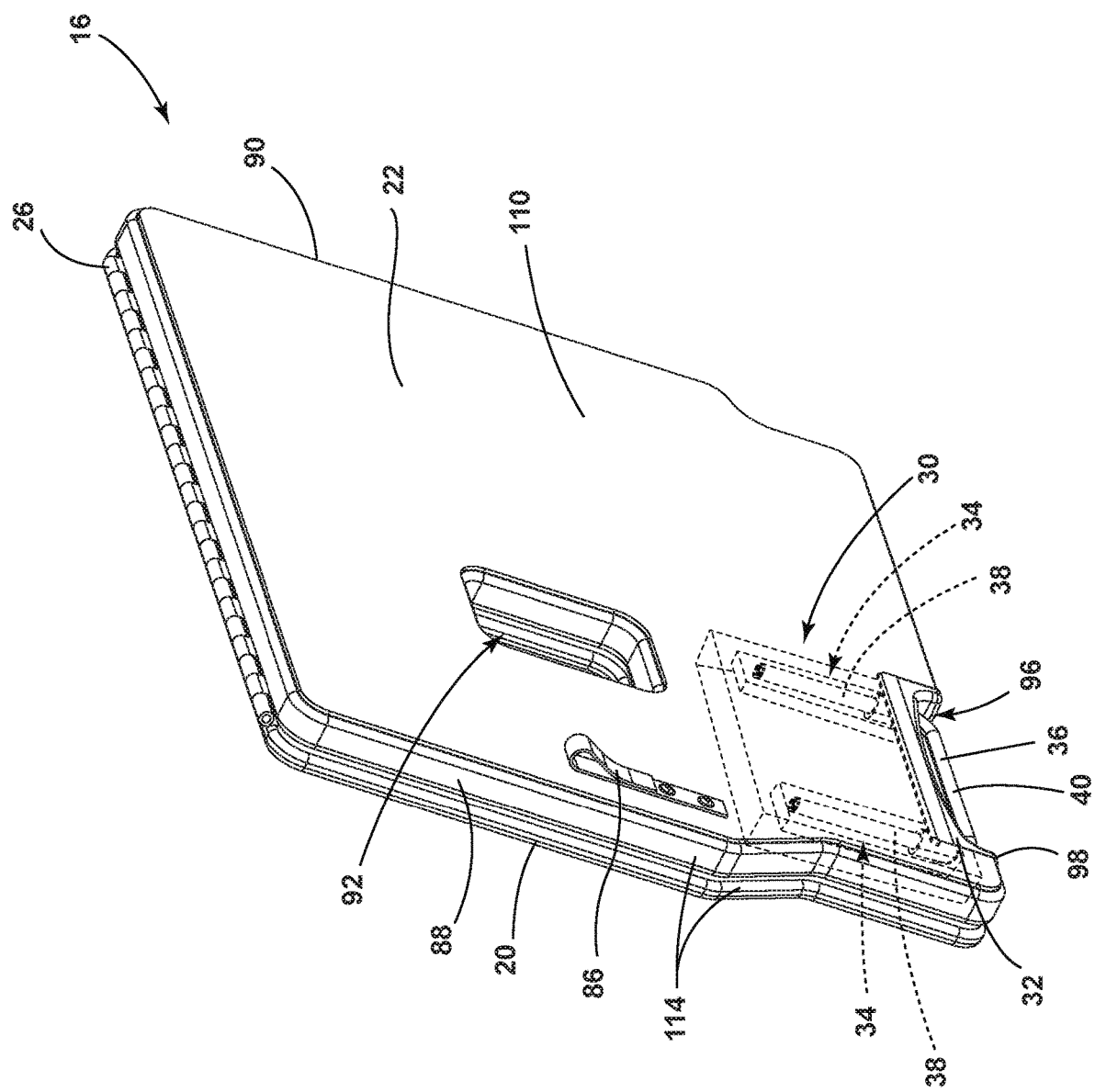
FIG. 2 is a side perspective view of the panel assembly of FIG. 1 removed from the seating assemblies.
Figure 3:
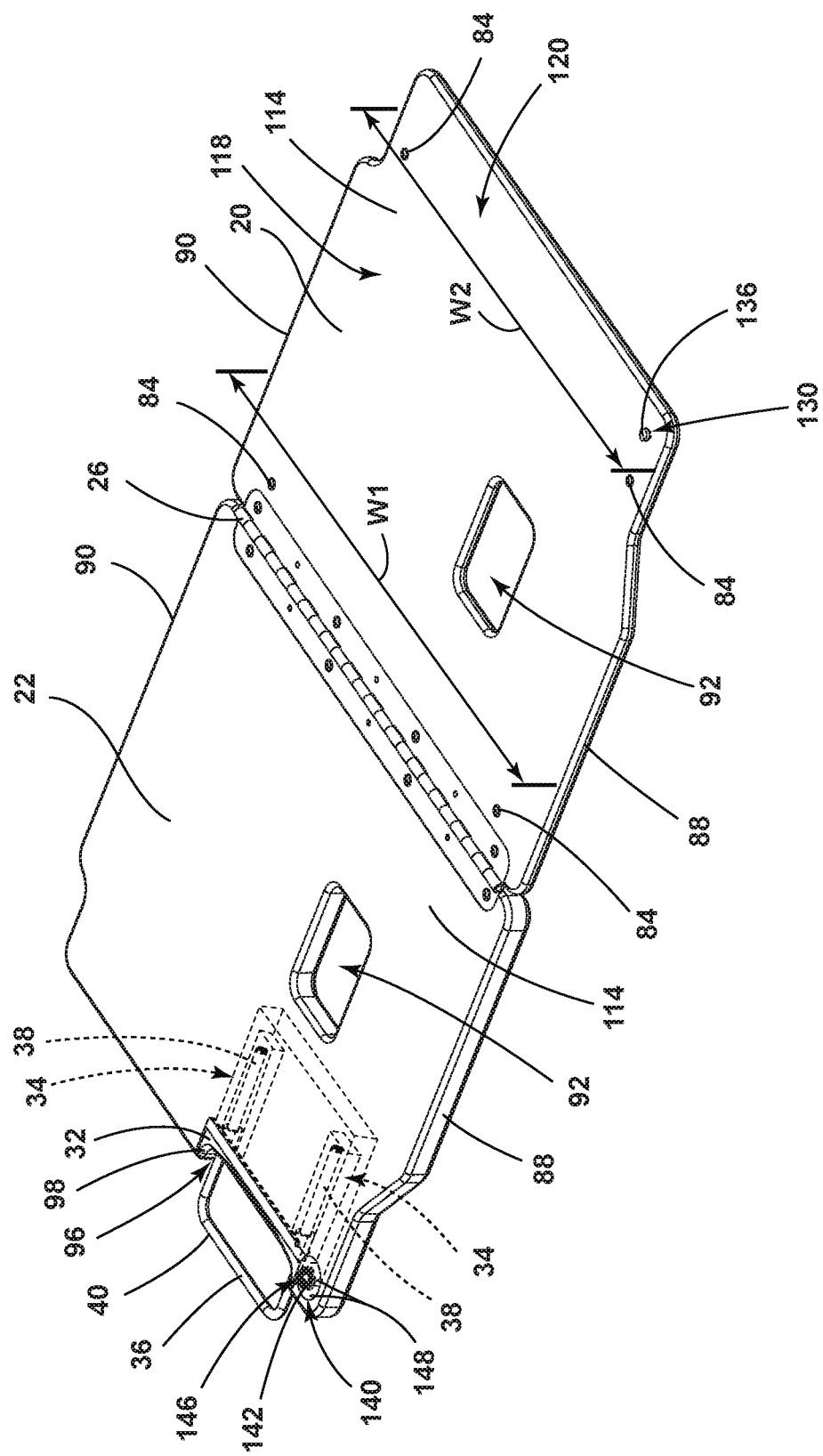
FIG. 3 is a side perspective view of the panel assembly of FIG. 2 in a second position.

Referring to FIGS. 1-12, reference numeral 10 generally designates a seating assembly including a seat base 12 operably coupled with a seatback 14. A panel assembly 16 is positioned on the seatback 14 and includes a first panel 20 coupled with the seatback 14 and a second panel 22 hingedly coupled with the first panel 20. The second panel 22 includes a connector assembly 30 having a housing 32 and a support 36 slidably coupled with the housing 32 and is movable between a first position (FIG. 2) and a second position (FIG. 3). The second panel 22 is vertically aligned with the first panel 20 in the first position and is substantially coplanar with the first panel 20 in the second position.

Referring now to FIG. 1, a plurality of seating assemblies 10 are illustrated as a seating system 48 positioned on a vehicle floor 54 having a front portion 50 and a rear portion 60. The plurality of seating assemblies 10 includes at least a forward row 64 of forward-folding seating assemblies 10 and a rear row 68 of stowable seating assemblies 10 and. As illustrated, the forward row 64 may be spaced apart from the rear row 68 by a central row 66. However, it will be understood that the plurality of seating assemblies 10 may include any number rows including only the forward row 64 and the rear row 68, multiple central rows 66, or any other configuration thereof without departing from the scope of the present disclosure. Further, the panel assembly 16 is described herein as engaging with a seating assembly 10 of the central row 66 but will be understood to be configured to engage with any forward-folding seating assemblies 10 positioned directly ahead of the panel assembly 16.

As shown in FIG. 1, each seating assembly 10 includes a seat base 12 and a seatback 14. A headrest assembly 56 may be coupled to the seatback 14. The headrest assembly 56 may be configured to be slidably adjusted and/or may be foldable forward or backward. For example, headrest assemblies 56 of some seating assemblies 10 may be foldable forward and others may be folded rearward. As illustrated, the rear row 68 of seating assemblies 10 may include multiple seating assemblies 10 each configured to be separately movable. However, it is will be understood that the seating assemblies 10 of the rear row 68 may be a bench seat to move as a single unit or may include two or more seating assemblies 10 configured to be movable as a unit. It is contemplated that the vehicle floor 54 may be configured as the floor 54 of any type of vehicle, such as a car, a truck, a van, etc. It is also contemplated that the panel assembly 16 concept set forth in this disclosure may be utilized with any row 64, 66, 68 of seating assemblies 10, depending on the configuration of the vehicle.

The seating assemblies 10 of the forward row 64 are positioned proximate the front portion 50 of the vehicle floor 54, and the seating assemblies 10 forming the rear row 68 are positioned proximate the rear portion 60 of the vehicle floor 54. The seating assemblies 10 of the central row 66 are positioned between the forward row 64 and the rear row 68. As illustrated, the rear row 68 may be positioned on a raised portion 70 of the vehicle floor 54 (e.g., the portion of the vehicle floor 54 extending over the rear wheel wells of the vehicle). The raised portion 70 may be substantially aligned with the seat base 12 of the seating assemblies 10 of the central row 66. As previously introduced, each of the seating assemblies 10 of the central row 66 includes a seat base 12 coupled with a seatback 14. The seating assemblies 10 of the central row 66 are movable from an upright position (see FIG. 1) into a pitched position (see FIG. 7) and/or a folded position (see FIG. 9).

Referring still to FIG. 1, each of the seatbacks 14 of the central row 66 includes a rear panel 76 extending across at least part of the seatback 14. Each rear panel 76 defines a receiving well 80 positioned proximate the joinder of the seat base 12 and the seatback 14. An upwardly extending connection member 82 is integrally formed with each rear panel 76 and extends into the respective receiving well 80. The connection member 82 may be sized to extend along any portion of the receiving well 80 including the entire width or a portion of the width. Each connection member 82 is configured to engage with the connector assembly 30 of one of the panel assemblies 16 (see FIG. 7) positioned on one of the seating assemblies 10 of the rear row 68, as described in more detail elsewhere herein. It will be understood that each of the seating assemblies 10 of the forward row 64 may have a rear panel 76 defining a receiving well 80 as described or may have a different configuration without departing from the scope of the present disclosure.

Figure 6:
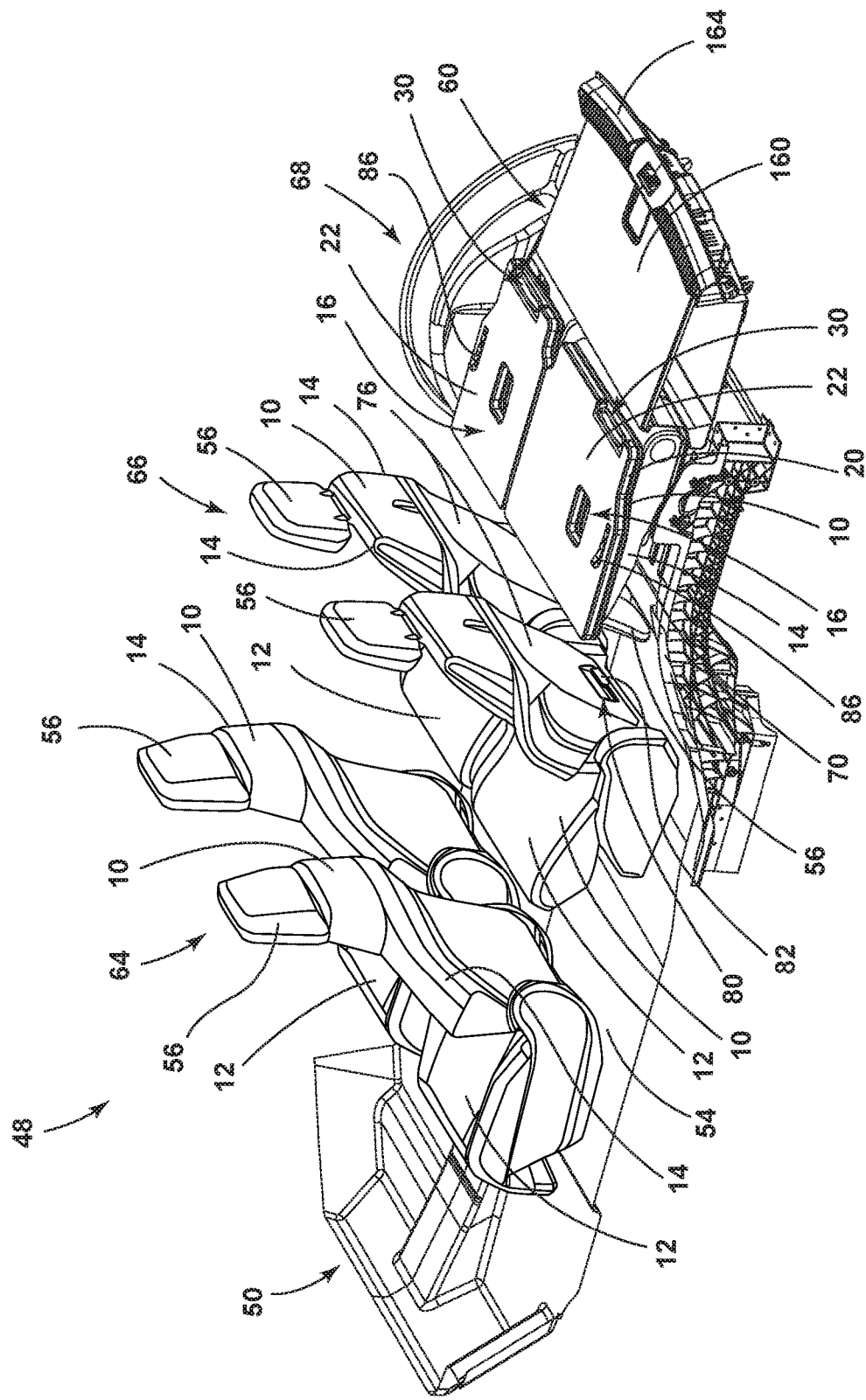
FIG. 6 is a top perspective view of the rows of seating assemblies of FIG. 1 with the seating assemblies of the rear row in a folded position.

As previously introduced, each of the seating assemblies 10 forming the rear row 68 includes a seat base 12 coupled with a seatback 14 and a foldable headrest assembly 56 extending from the seatback 14. The seating assemblies 10 are movable between an upright position and a stowed position. In the stowed position, the headrest assembly 56 is configured to be folded down to be at least partially perpendicular to the seatback 14 and is locked in this position. When the seating assembly 10 is in the stowed position, the seatback 14 may be substantially parallel to the raised portion 70 of the vehicle floor 54 (FIG. 6).

As shown in FIG. 1, panel assemblies 16 are coupled with the seatbacks 14 of the seating assemblies 10 of the rear row 68. Each panel assembly 16 may be configured to be coupled with a single seatback 14 or with multiple seatbacks 14, depending on the configuration of the seating assemblies 10. For example, as illustrated in FIGS. 1 and 6-10, a single panel assembly 16 may be positioned across two seating assemblies 10 configured to move as a unit. Each panel assembly 16 may be a flipper panel and may be configured to act as part of a cargo floor 160 (FIGS. 6-12) in various examples, as discussed in more detail elsewhere herein.

Referring now to FIGS. 2 and 3, a single panel assembly 16 is exemplarily illustrated. The panel assembly 16 includes a first panel 20 and a second panel 22 coupled by a hinge 26. The hinge 26 may be a flipper panel hinge, a living hinge, or any other hinge configured to allow movement of the second panel 22 between a first position (FIG. 2) and a second position (FIG. 3). In the first position, the second panel 22 abuts the first panel 20 and the panel assembly 16 is in a stowed position. In the second position, the second panel 22 extends from and is substantially coplanar with the first panel 20.

Each of the first and second panels 20, 22 includes an outboard edge 88 and an inboard edge 90. Where more than one panel assembly 16 is used on the seating assemblies 10 of the rear row 68, the inboard edges 90 the panels 20, 22 of each panel assembly 16 are positioned proximate one another. When the second panel 22 is in the second position, the outboard edge 88 of the second panel 22 and/or the outboard edge 88 of the first panel 20 may be spaced apart from a wall or door of the vehicle to define a gap (not shown).

As illustrated in at least FIGS. 1 and 3, each panel 20, 22 of the panel assembly 16 is shaped to complement the shape of the seatback(s) 14 of the respective seating assembly 10 the panel assembly 16 is coupled with. As illustrated, each panel 20, 22 includes a primary portion 118 having a first width W1 and a secondary portion 120 having a second width W2. Each panel 20, 22 is tapered from the primary portion 118 to the secondary portion 120 such that the second width W2 is less than the first width W1. The secondary portion 120 is positioned proximate the joinder of the seat base 12 and seatback 14 of the seating assembly 10. However, it will be understood that the size and shape of each of the panels 20, 22 of the panel assembly 16 is determined by the seating assembly 10 or seating assemblies 10 coupled with the panel assembly 16 and may include any variation based on the configuration of the seating assembly 10 or seating assemblies 10.

As shown in FIG. 2, the second panel 22 may include a member 86 configured to actuate movement of the second panel 22 from the first position to the second position when force is applied. The member 86 may be, for example, a handle, a strap, a pull tab, or another member configured to allow a user to move the second panel 22 from the first position to the second position. As illustrated, the member 86 may be positioned proximate the outboard edge 88 of the second panel 22. However, it is contemplated that the member 86 may be positioned in any position on the second panel 22 without departing from the scope of the present disclosure. The member 86 may be coupled with the second panel 22 or may be integrally formed with the second panel 22. For example, the member 86 may be positioned in an opening 92 defined by the second panel 22.

With reference again to FIGS. 2 and 3, the panel assembly 16 includes the connector assembly 30 as previously introduced. The connector assembly 30 is configured to engage with a connection member 82, as described in more detail elsewhere herein. As illustrated, the connector assembly 30 is positioned on the second panel 22 proximate the outboard edge 88. However, it will be understood that the connector assembly 30 may be positioned in any location on the second panel 22 without departing from the scope of the present disclosure. It is also contemplated that a connector assembly 30 may be positioned on each of the first and second panels 20, 22 without departing from the scope of the present disclosure.

As previously introduced, the connector assembly 30 includes a housing 32 coupled with the second panel 22 and defining one or more receiving channels 34. A support 36 is slidably coupled with the housing 32 and movable between a stowed position and an extended position. It is contemplated that the support 36 may be moved between a plurality of extended positions without departing from the scope of the present disclosure. The movement of the support 36 between a plurality of extended positions may be configured to allow the panel assembly 16 to be engaged with a seating assembly 10 or other vehicle feature when the seating assembly 10 is in various positions (e.g., a pitched position, a folded position, or an upright position).

As shown in FIGS. 2 and 3, the housing 32 defines a pair of receiving channels 34 and a receiving well 96 in communication with the pair of receiving channels 34. The receiving well 96 is defined to extend across an outer edge 98 of the housing 32 and may extend between the pair of receiving channels 34. The support 36 includes a pair of legs 38 and a central portion 40 integrally formed with, and extending between, the legs 38. Each of the pair of receiving channels 34 is configured to slidably receive one of the legs 38 of the support 36. When the support 36 is in the stowed position, the central portion 40 is received by the receiving well 96. When the support 36 is in the extended position, the central portion 40 is spaced apart from the outer edge 98 of the housing 32 by the legs 38.

Figure 4:
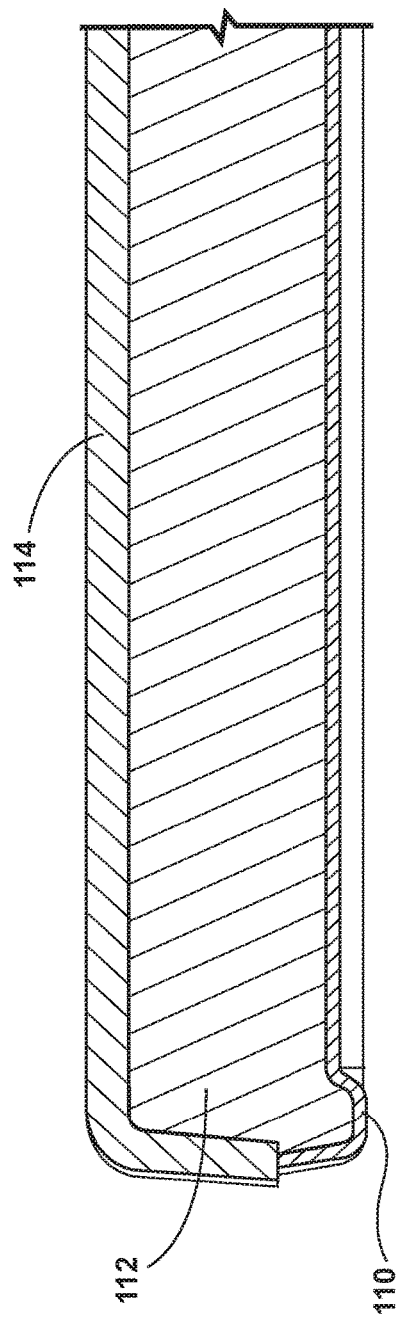
FIG. 4 is a schematic view of a partial cross-section of one of the first and second panels of FIG. 3, according to various examples.

Referring now to FIG. 4, a schematic cross-section of one of the first and/or second panels 20, 22 is shown. Each of the first and second panels 20, 22 of the panel assembly 16 includes a support panel 110 configured to support an inner substrate 112. The support panel 110 may be formed of a polymer which may include a filler; for example, the support panel 110 may be formed of thermoplastic olefin (TPO). A cover material 114 is positioned over the inner substrate 112 and coupled with the support panel 110 to enclose the substrate 112. It is contemplated that the cover material 114 may be any material configured to match the interior of the vehicle (e.g., carpet, fabric, etc.). Overall, each panel 20, 22 may be between about 20 mm to about 30 mm thick to support loads when the second panel 22 is in the second position. For example, the substrate 112 may be between about 14 mm and about 18 mm thick, the cover material 114 may be about 2 mm to about 4 mm thick, and the support panel 110 may be between about 0.5 mm and about 2 mm thick.

Figure 5:
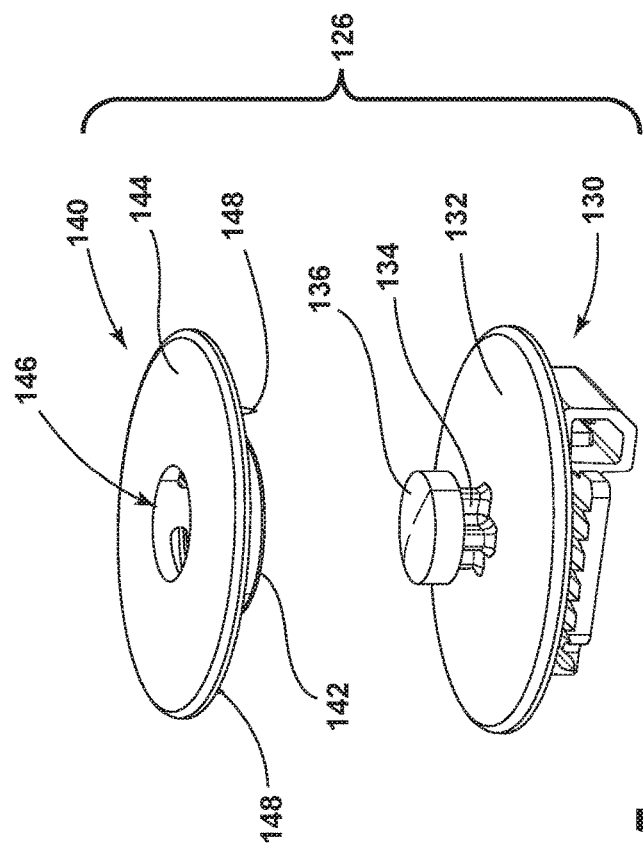
FIG. 5 is a side perspective view of a retention assembly of removed from the panel assembly of FIG. 3.

As best shown in FIGS. 3 and 5, the panel assembly 16 includes a retention assembly 126 configured to couple the second panel 22 with the first panel 20 when the second panel 22 is in the first position (FIG. 2). The retention assembly 126 includes an anchor member 130 coupled with one of the first and second panels 20, 22. The anchor member 130 includes a protrusion 134 that includes a coupling end 136. The coupling end 136 may have a generally circular shape. A base lip 132 may extend around the protrusion 134 and the coupling end 136 and may be substantially circular. When the anchor member 130 is coupled with the respective panel 20, 22, the cover material 114 may be configured to extend over the base lip 132 such that only the protrusion 134 and the coupling end 136 are visible.

A receiving member 140 is coupled with the other of the first and second panels 20, 22 and includes an outer lip 144 and a body portion 142. The body portion 142 defines a receiving well 146 and extends from, and is surrounded by, the outer lip 144. The outer lip 144 is configured to be positioned substantially flush with the cover material 114 of the respective panel 20, 22. The receiving well 146 is defined to at least partially receive the protrusion 134 to retain the second panel 22 in the first position. For example, the coupling end 136 of the protrusion 134 may be configured to snap engage with the receiving well 146 to removably couple the second panel 22 with the first panel 20. Furthermore, a plurality of grips 148 may extend from the outer lip 144 of the receiving member 140 and are configured to engage with the cover material 114 of the opposing panel 20, 22 to further retain the second panel 22 in the first position. A single retention assembly 126 may be used or a plurality of retention assemblies 126 may be used without departing from the scope of the present disclosure.

Figure 9:
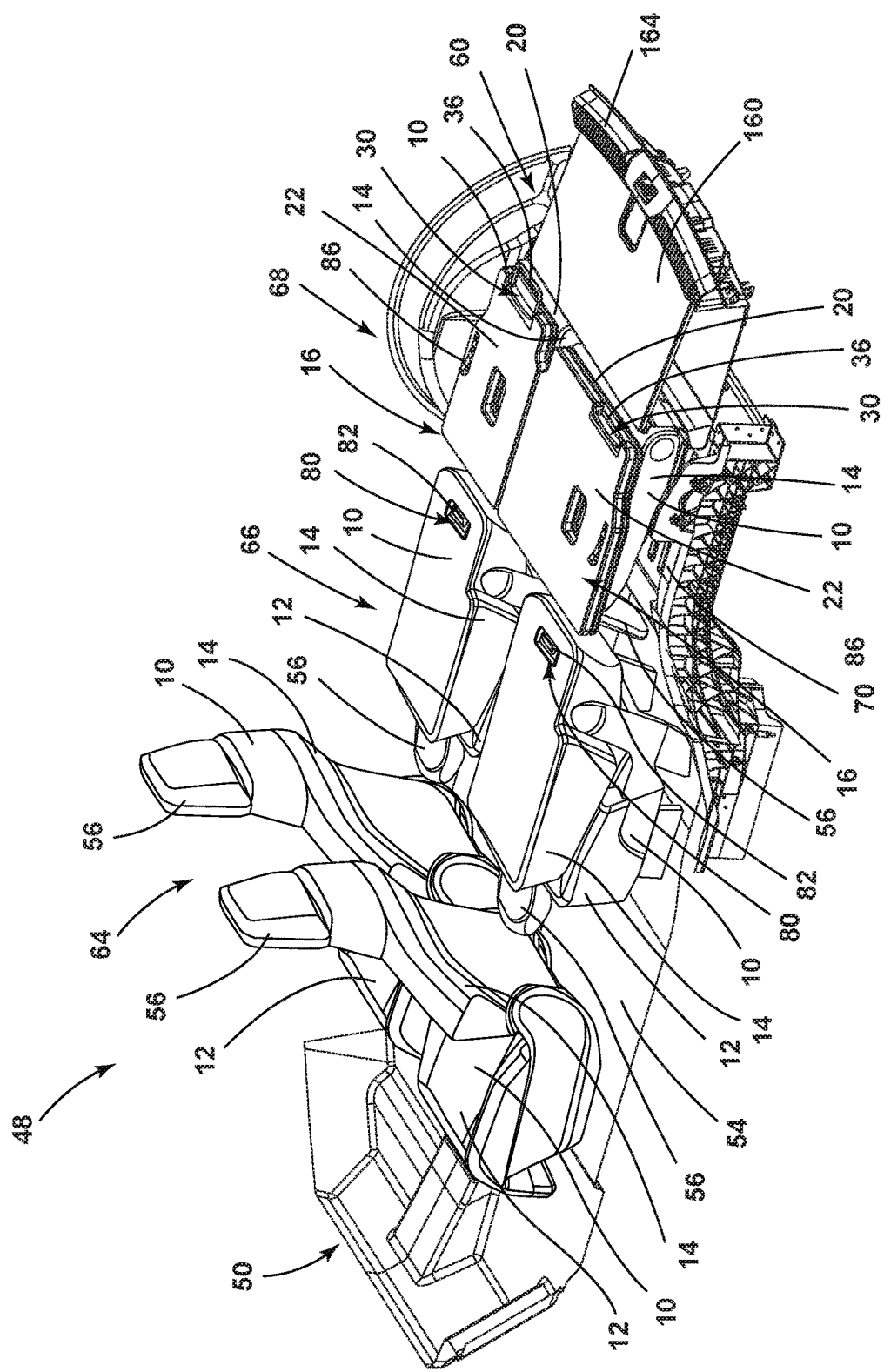
FIG. 9 is a top perspective view of the seating assemblies of FIG. 1 with the seating assemblies of the rear row in a folded position and the seating assemblies of a central row in a folded position and the panel assembly in the first position.
Figure 10:
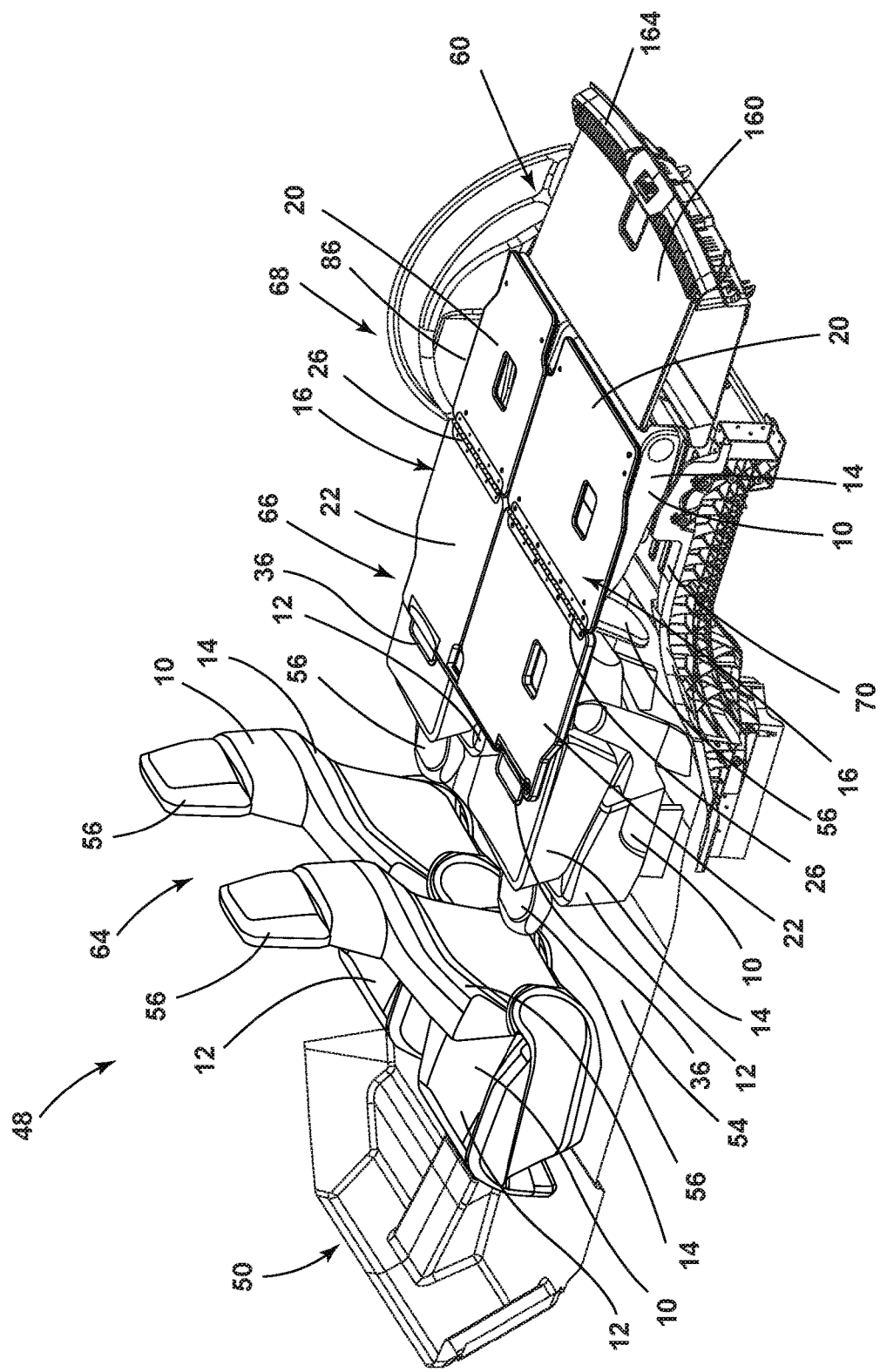
FIG. 10 is a top perspective view of the seating assemblies of FIG. 1 with the seating assemblies of the rear row in a folded position and the seating assemblies of a central row in a pitched position and the panel assembly in a second position.
Figure 11:
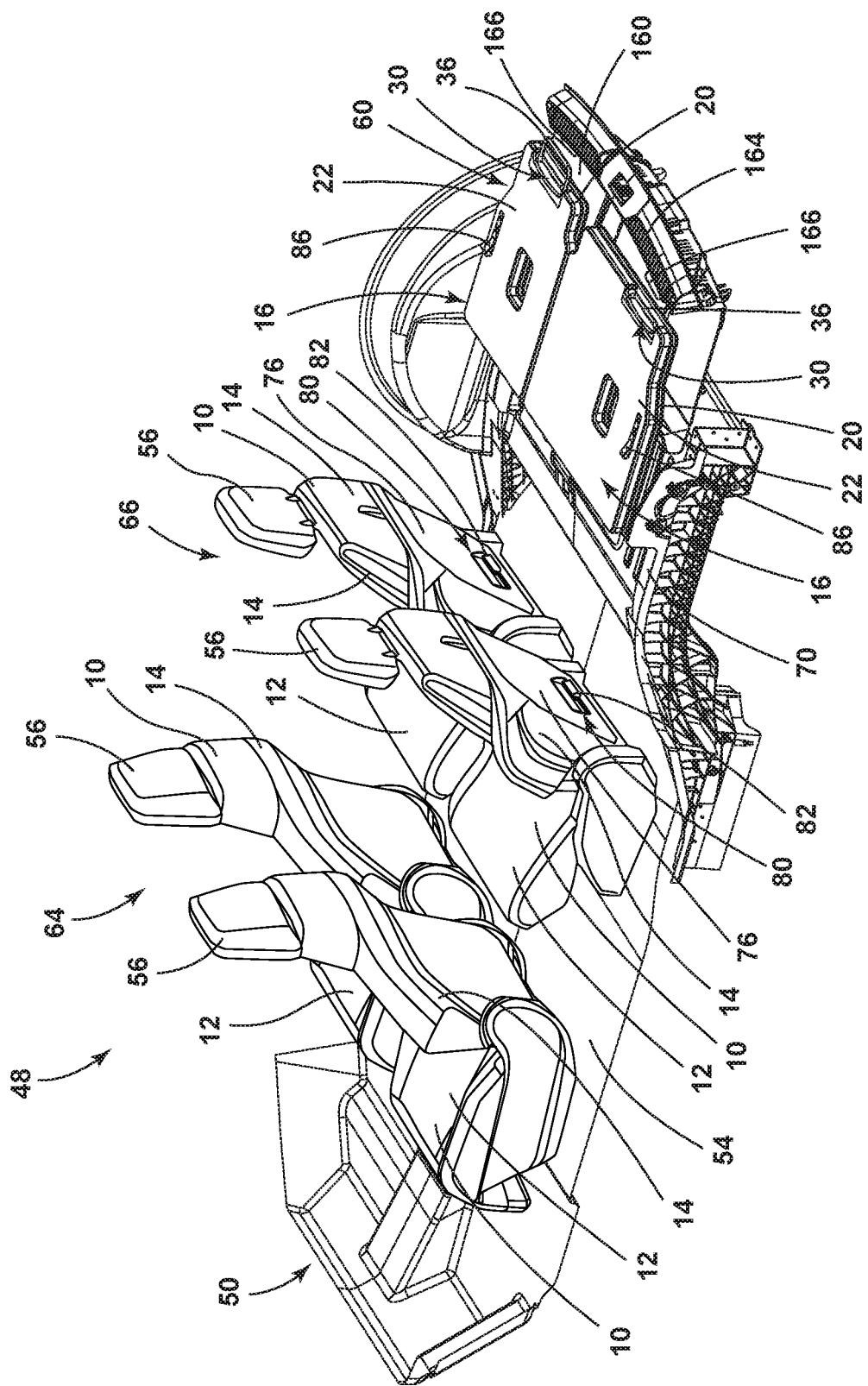
FIG. 11 is a top perspective view of seating assemblies exemplarily positioned on a vehicle floor and with a panel assembly positioned on a cargo floor in a first position, according to various examples.
Figure 12:
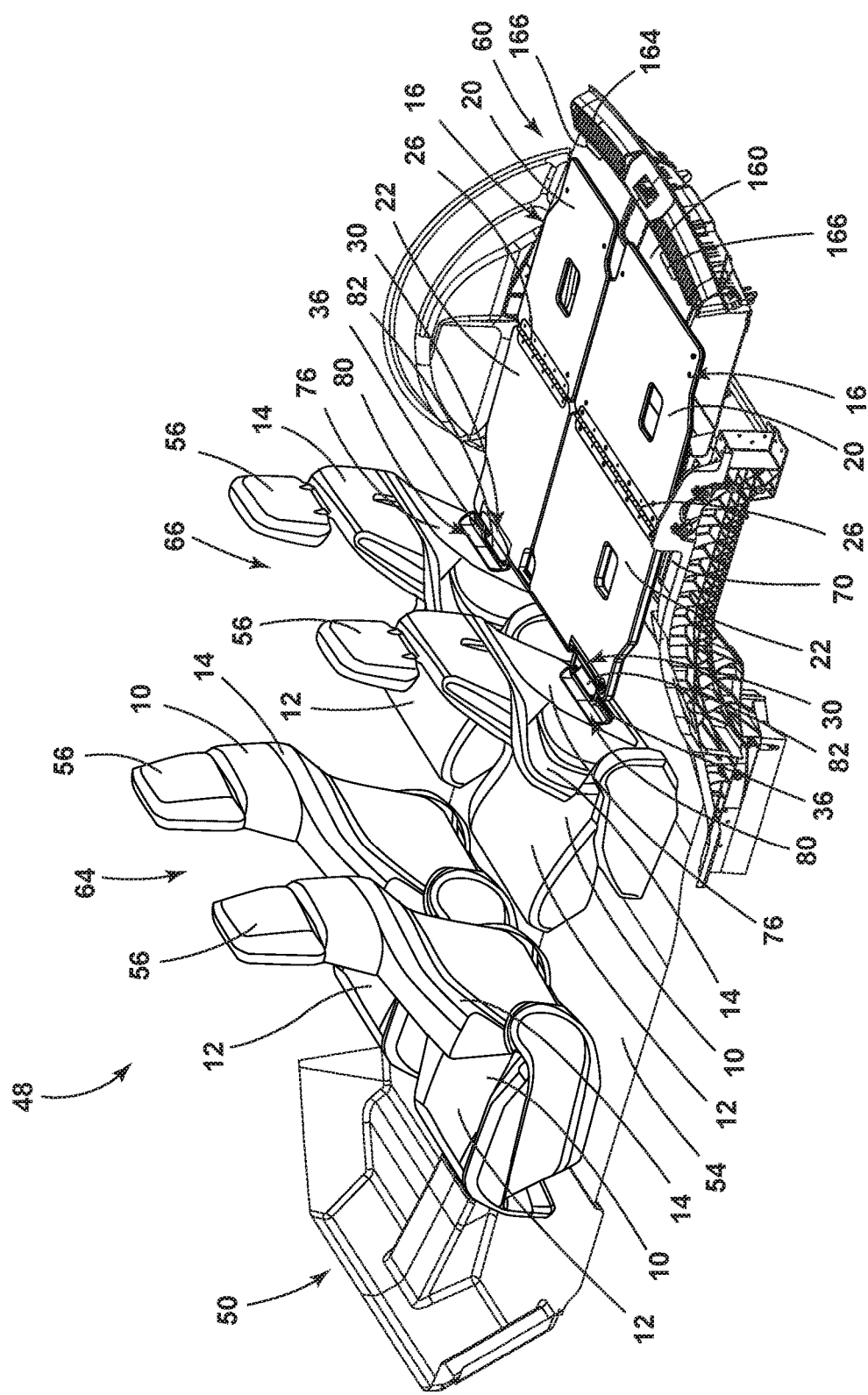
FIG. 12 is a top perspective view of the seating assemblies of FIG. 11 with the panel assembly in a second position.

With reference now to FIGS. 6-12, the seating system 48 is illustrated in various configurations including configurations with the seat bases 12 of the seating assemblies 10 of the rear row 68 removed or reduced (FIGS. 6-10) and configurations without the seating assemblies 10 of the rear row 68 (FIGS. 11 and 12). As shown in FIG. 6, the seating assemblies 10 of the rear row 68 are illustrated in the stowed position with the headrest assemblies 56 folded down. The first panel 20 of each panel assembly 16 is coupled with the seatback 14 of the respective seating assembly 10 or seating assemblies 10. For example, the first panel 20 may be coupled with the seatback 14 by a plurality of fasteners 84 (FIG. 3). The second panel 22 of each panel assembly 16 is in the first position, and the support 36 of each connector assembly 30 is illustrated in a stowed position. When the seating assemblies 10 of the rear row 68 are in the stowed position, the seatbacks 14 and panel assemblies 16 are substantially parallel to a cargo floor 160.

Figure 7:
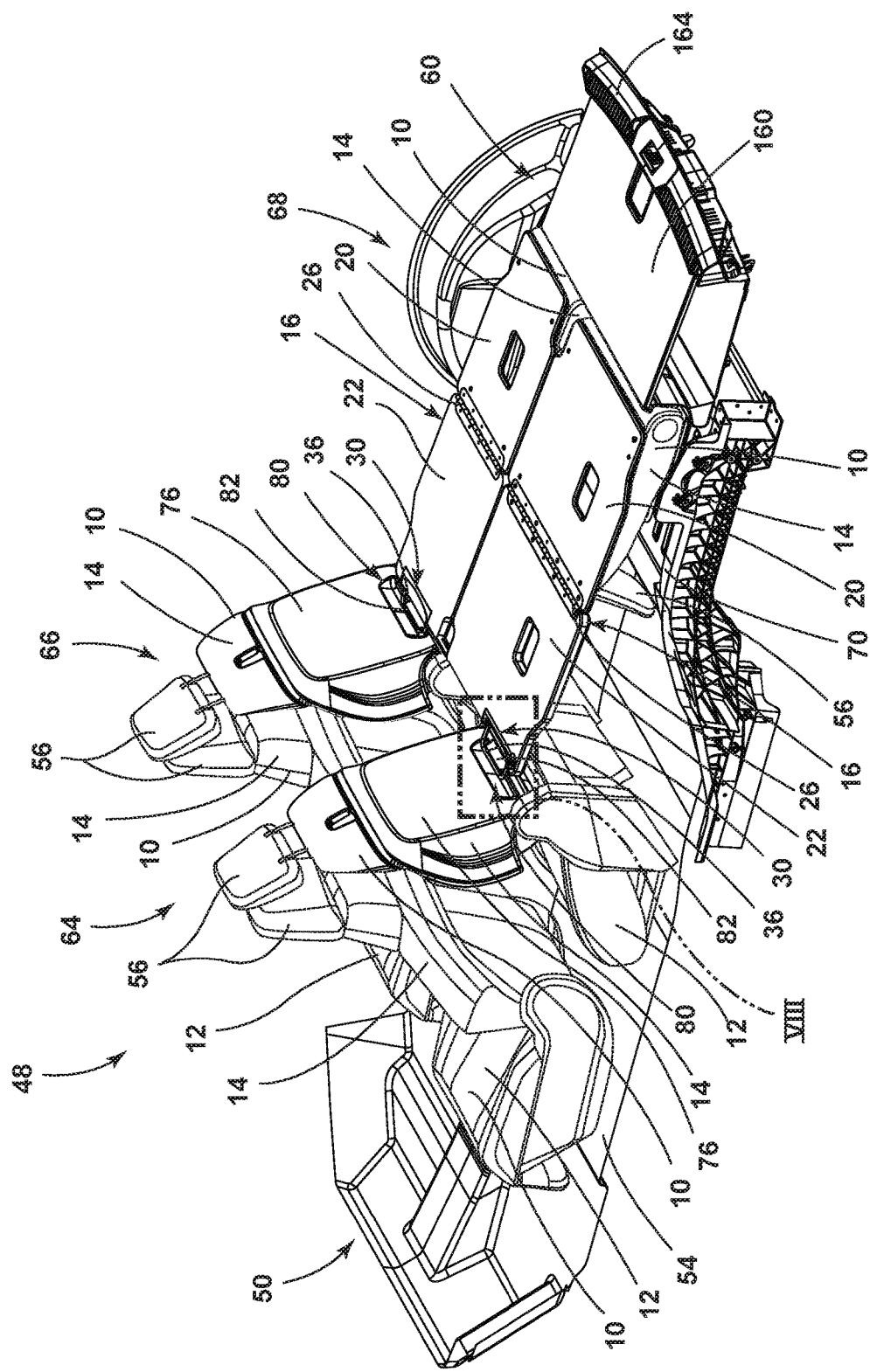
FIG. 7 is a top perspective view of the seating assemblies of FIG. 1 with the seating assemblies of the rear row in a folded position and the seating assemblies of a central row in a pitched position and the panel assembly in a second position.

Referring now to FIG. 7, the seating system 48 is illustrated with the seating assemblies 10 of the rear row 68 in the stowed position and the seating assemblies 10 of the central row 66 in the pitched position. In the pitched position, the headrest assembly 56 may be folded rearward to prevent contact with another seating assembly 10. The second panels 22 of the panel assemblies 16 are illustrated in the second position such that the first and second panels 20, 22 and the cargo floor 160 are substantially coplanar. This allows the panels 20, 22 of the panel assembly 16 to act as an extension of the cargo floor 160. Each of the supports 36 of the connector assemblies 30 is illustrated in the extended position, as discussed in more detail below.

Figure 8:
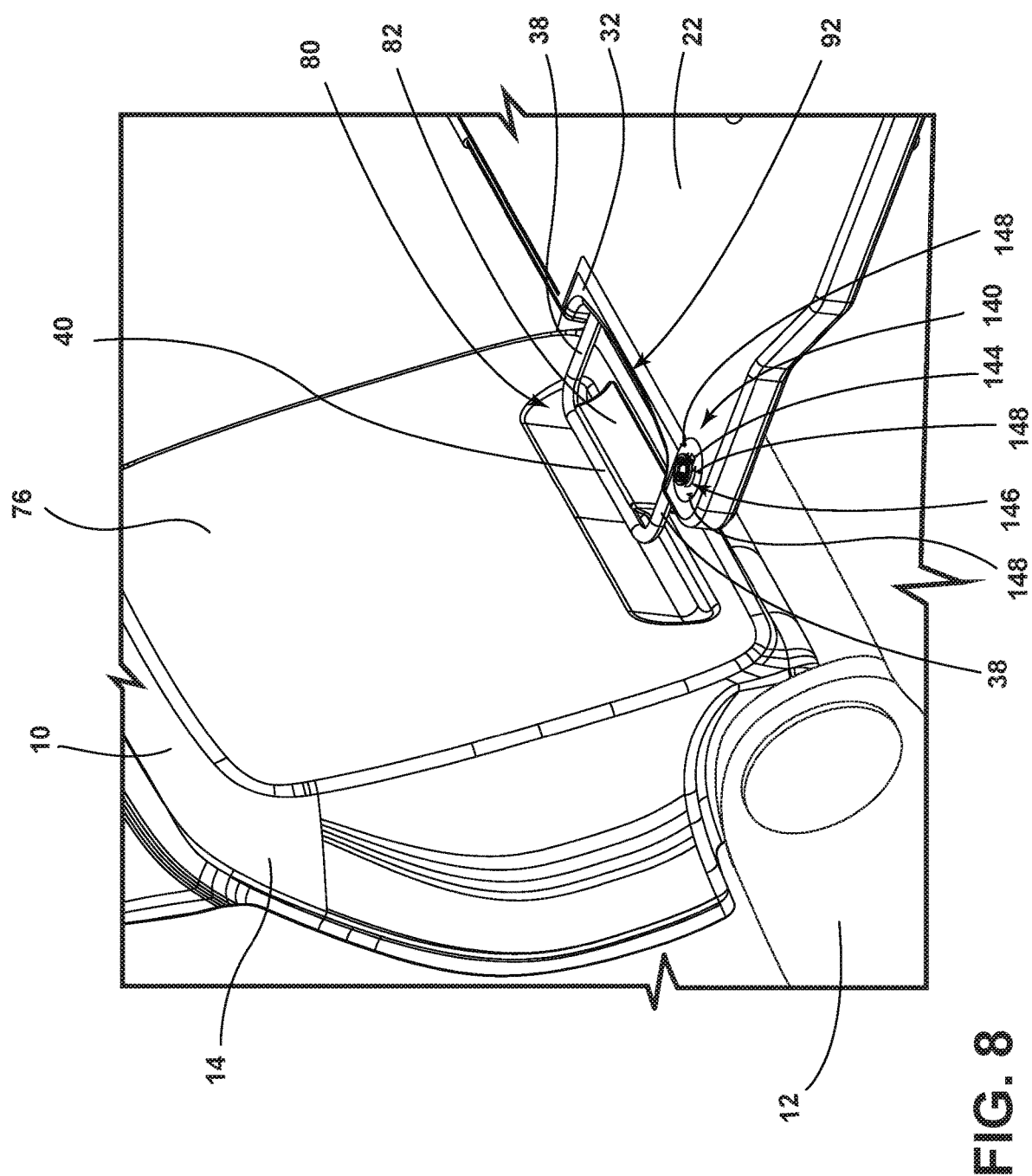
FIG. 8 is an enlarged view of area VIII of FIG. 7.

As best shown in FIG. 8, each connector assembly 30 of the panel assemblies 16 is engaged with the connection member 82 of a respective seating assembly 10 of the central row 66. The support 36 of each connector assembly 30 is positioned such that the central portion 40 of the support 36 is received by the receiving well 80 of the rear panel 76 of the respective seatback 14 and abuts the respective connection member 82. The engagement of the support 36 with the connection member 82 couples the panel assembly 16 with the respective seating assembly 10 of the central row 66 to create an extension of the cargo floor 160 to the seatbacks 14 of the seating assemblies 10 of the central row 66. The positioning of the connection member 82 on the seatback 14 further may provide support for the panel assembly 16 when the second panel 22 is in the second position. For example, the second panel 22 may extend at least partially over the rear panel 76 of the seatback 14 when the support 36 is engaged with the connection member 82.

Referring now to FIG. 9, the seating assemblies 10 of the rear row 68 are illustrated in the stowed position, and the seating assemblies 10 of the central row 66 are illustrated in the folded position. The second panels 22 of the panel assemblies 16 are positioned in the first position and coupled with the respective first panels 20. As shown in FIG. 10, the second panels 22 are movable to the second position such that the second panels 22 extend along the seatback 14 of the seating assemblies 10 of the central row 66. It is contemplated that the second panels 22 may be coupled with the seatbacks 14 using fasteners, additional connection members, or any other coupling assembly or member to maintain the position of the second panels 22 in the second position without departing from the scope of the present disclosure.

Referring now to FIGS. 11 and 12, the plurality of seating assemblies 10 of the seating system 48 are illustrated positioned on the vehicle floor 54 with the rear row 68 of seating assemblies 10 removed, as previously introduced. The panel assemblies 16 are positioned on the cargo floor 160 such that the first panel 20 of each panel assembly 16 is coupled with the cargo floor 160. For example, the first panel 20 may be coupled with the cargo floor 160 by a plurality of fasteners 84 (FIG. 3). Referring to FIG. 11, the second panel 22 of each panel assembly 16 is illustrated in the first position. As shown, the cargo floor 160 may include a rear edge 164 that includes one or more connection members 166. Each of these connection members 166 may be configured to be selectively engaged with the connector assembly 30 of a panel assembly 16 when the second panel 22 of the panel assembly 16 is in the first position. As shown in FIG. 12, the second panel 22 of each panel assembly 16 is movable to the second position. In the second position, each of the connection members 82 of the seating assemblies 10 of the central row 66 may be configured to be engaged with the connector assembly 30 of one of the panel assemblies 16, as described elsewhere herein. When the panel assembly 16 is positioned on the cargo floor 160, the connector assembly 30 may be configured to engage with the connection member 82 when the respective seating assembly 10 is in the upright position.

Use of the panel assembly 16 to create a folding load floor may provide extended space and support for the cargo area of a vehicle. The connection assembly 30 of each panel assembly 16 may be configured to provide both load floor strength, a feature for attachments, and adjustability for different seating configurations. The coupling of the connection assembly 30 with a panel 20, 22 of the panel assembly 16 to be assembled within the load floor construction may further assure load integrity. Further, the retention assembly 126 may be configured to ensure that the panel assembly 16 remains stowed in the first position when the seating assemblies 10 of the rear row 68 are in an upright or design position.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A seating assembly comprising:
   a seat base operably coupled with a seatback;
   a panel assembly including a first panel coupled with the seatback and a second panel hingedly coupled with the first panel, the second panel including a connector assembly having a housing and a support slidably coupled with the housing, wherein the second panel is movable between a first position and a second position, and further wherein the second panel is vertically aligned with the first panel in the first position and is substantially coplanar with the first panel in the second position;
   an anchor member positioned on the first panel and having a coupling end extending from the first panel; and
   a receiving member positioned on the second panel and defining a receiving well, wherein the coupling end of the anchor member is received by the receiving well to retain the second panel in the first position.

2. The seating assembly of claim 1, wherein the receiving member further includes a plurality of grips configured to engage with a cover material of the first panel to retain the second panel in the first position.

3. The seating assembly of claim 1, further comprising:
   a connection member positioned proximate the panel assembly, wherein the support of the connector assembly is configured to be selectively engaged with the connection member.

4. The seating assembly of claim 3, wherein the connection member is positioned on a rear edge of a cargo floor positioned rearward of the panel assembly.

5. The seating assembly of claim 1, further comprising:
   a member extending from the second panel and configured to actuate movement of the second panel from the first position to the second position.

6. A seating system comprising:
   a first seating assembly having a first seat base operably coupled with a first seatback;
   a second seating assembly having a second seat base operably coupled with a second seatback, wherein the first seating assembly is positioned forward of the second seating assembly;
   a first panel positioned on the second seatback;
   a second panel hingedly coupled with the first panel and movable between first and second positions, wherein the second panel is substantially coplanar with the first panel when the second panel is in the second position and is configured to be selectively engaged with the first seatback in the second position;
- a connector assembly having a support slidably coupled with a housing, wherein the housing is coupled with the second panel; and
- a connection member positioned on the first seatback, wherein the first seating assembly is movable between an upright position and a pitched position, and further wherein the connector assembly is configured to be selectively engaged with the connection member when the first seating assembly is in the pitched position.

7. The seating system of claim 6, further comprising:
- an anchor member positioned on the first panel; and
- a receiving member positioned on the second panel and defining a receiving well, wherein the anchor member is at least partially received by the receiving well to retain the second panel in the first position.

8. The seating system of claim 6, wherein the connection member is integrally formed with a rear panel of the first seatback.

9. A seating system comprising:
- a first seating assembly seat base operably coupled with a first seatback;
- a second seating assembly having a second seat base operably coupled to a second seatback, wherein the first seating assembly is positioned forward of the second seating assembly;
- a first positioned on the second seatback; and
- a second panel hingedly coupled with the first panel and movable between first and second positions, wherein the second panel is substantially coplanar with the first panel when the second and is in the second position and is configured to be selectively engaged with the first seatback in the second position, wherein the second seating assembly includes a headrest, the headrest configured to at least partially support the second panel in the second position.

10. The seating system of claim 6, wherein the first seating assembly is movable between an upright position and a folded position, and further wherein the second panel extends along the first seatback in the second position.

11. A seating system comprising:
- a first seating assembly having a first seat base operably coupled with a first seatback;
- a panel assembly having a first panel and a second panel, the second panel hingedly coupled with the first panel and movable between first and second positions, wherein the second panel is substantially coplanar with the first panel when the second panel is in the second position;
- a connection member positioned proximate the panel assembly; and
- a connector assembly positioned on the second panel, the connector assembly including a support configured to be selectively engaged with the connection member, wherein the connector assembly further includes a housing coupled with the second panel and the support is movable between a stowed position and an extended position, and further wherein the support is received by the housing in the stowed position, and herein first panel is coupled with a cargo floor positioned rearward seating assembly.

12. The seating system of claim 11, wherein the connection member is positioned on a rear edge of the cargo floor.

13. The seating system of claim 11, wherein the connection member is positioned on the first seatback.

14. The seating system of claim 11, further comprising:
- a second seating assembly having a second seat base operably coupled with a second seatback, wherein the first seating assembly is positioned forward of the second seating assembly and the first panel is coupled with the second seatback.

15. The seating system of claim 14, further comprising:
- a retention assembly positioned between the first and second panels to selectively retain the second panel in the first position.

* * * * *

UNITED STATES PATENT AND TRADEMARK OFFICE
CERTIFICATE OF CORRECTION

| | |
|---|---|
| PATENT NO. | : 11,279,300 B1 |
| APPLICATION NO. | : 17/073776 |
| DATED | : March 22, 2022 |
| INVENTOR(S) | : Line et al. |

It is certified that error appears in the above-identified patent and that said Letters Patent is hereby corrected as shown below:

In the Claims

Column 11:
Claim 9, Line 24;
After "assembly" insert --having a first--.
Claim 9, Line 27;
"to" should be --with--.
Claim 9, Line 30;
After "first" insert --panel--.
Claim 9, Line 34;
"second and is" should be --second panel is--.

Column 12:
Claim 11, Line 23;
"herein first" should be --wherein the--.
Claim 11, Line 24;
After "rearward" insert --of the--.

Signed and Sealed this
Seventeenth Day of May, 2022

Katherine Kelly Vidal
*Director of the United States Patent and Trademark Office*